United States Patent
Adar (10) Patent No.: US 9,965,256 B2
(45) Date of Patent: May 8, 2018

(54) METHOD AND SYSTEM FOR EVALUATING COMPUTATIONAL ALGORITHMS DESCRIBED IN PRINTED PUBLICATIONS

(71) Applicant: The Joan and Irwin Jacobs Technion-Cornell Institute, New York, NY (US)

(72) Inventor: Simon Adar, Tenafly, NJ (US)

(73) Assignee: The Joan and Irwin Jacobs Technion-Cornell Institute, New York, NY (US)

(*) Notice: Subject to any disclaimer, the term of this patent is extended or adjusted under 35 U.S.C. 154(b) by 0 days. days.

(21) Appl. No.: 15/185,538

(22) Filed: Jun. 17, 2016

(65) Prior Publication Data

US 2016/0371176 A1    Dec. 22, 2016

Related U.S. Application Data

(60) Provisional application No. 62/181,451, filed on Jun. 18, 2015, provisional application No. 62/271,800, filed on Dec. 28, 2015.

(51) Int. Cl.
 *G06F 9/44*  (2006.01)
 *G06F 9/455* (2006.01)
 *G06F 11/34* (2006.01)

(52) U.S. Cl.
 CPC ........... *G06F 8/36* (2013.01); *G06F 9/45504* (2013.01); *G06F 11/3428* (2013.01)

(58) Field of Classification Search
 CPC .................. G06F 8/36; G06F 11/3428
 (Continued)

(56) References Cited

U.S. PATENT DOCUMENTS 6,546,418 B2    4/2003  Schena et al.
6,775,824 B1 *  8/2004  Osborne, II ........ G06F 11/3664
                                                       714/46
(Continued)

FOREIGN PATENT DOCUMENTS

WO    2001077882 A1    10/2001
WO    2012054016 A1    4/2012
WO    2015020722 A1    2/2015

OTHER PUBLICATIONS

Arcuri et al., "A Memetic Algorithm for Test Data Generation of Object-Oriented Software", IEEE, 2007, 8pg.*

(Continued)

*Primary Examiner* — Ryan D. Coyer
(74) *Attorney, Agent, or Firm* — M&B IP Analysts, LLC (57) ABSTRACT

A system and method for evaluating computational algorithms described in printed publications are provided. The method comprises analyzing a printed publication to identify at least one computational algorithm described in the printed publication; analyzing the at least one identified computational algorithm to identify at least algorithm-indicating information related to the at least one identified computational algorithm; detecting, using the algorithm-indicating information, at least one software container likely to be associated with the at least one identified computational algorithm; and executing the at least one software container in a computing environment, wherein the computing environment includes computing resources configured to support execution of the software container.

23 Claims, 6 Drawing Sheets

(58) Field of Classification Search
USPC .......................................................... 717/125
See application file for complete search history.

(56) References Cited

U.S. PATENT DOCUMENTS

| | | | |
|---|---|---|---|
| 7,003,777 B2* | 2/2006 | Hines ........................ | G06F 8/36 709/223 |
| 7,159,224 B2* | 1/2007 | Sharma ...................... | G06F 8/10 719/310 |
| 8,373,724 B2 | 2/2013 | Ratnakar et al. | |
| 8,510,712 B1* | 8/2013 | Killmar, III ......... | G06F 11/3684 717/124 |
| 8,527,943 B1* | 9/2013 | Chiluvuri .................. | G06F 8/36 717/106 |
| 9,047,542 B2 | 6/2015 | Graushar et al. | |
| 2002/0069240 A1 | 6/2002 | Berk | |
| 2003/0142819 A1* | 7/2003 | Bellocchio .......... | G06F 11/3608 380/28 |
| 2005/0278622 A1 | 12/2005 | Betts et al. | |
| 2007/0033440 A1* | 2/2007 | Tillmann ............ | G06F 11/3684 714/38.14 |
| 2007/0150821 A1 | 6/2007 | Thunemann et al. | |
| 2007/0272733 A1 | 11/2007 | Spector | |
| 2008/0007779 A1 | 1/2008 | Gennip et al. | |
| 2008/0091938 A1* | 4/2008 | Pedersen .................. | H04L 9/00 713/153 |
| 2009/0108057 A1 | 4/2009 | Mu et al. | |
| 2009/0158153 A1 | 6/2009 | Courteaux | |
| 2011/0107316 A1 | 5/2011 | Gutz et al. | |
| 2012/0054716 A1* | 3/2012 | Tailliez ..................... | G06F 8/61 717/107 |
| 2013/0132774 A1* | 5/2013 | Somendra ........... | G06F 11/3688 714/32 |
| 2013/0276068 A1 | 10/2013 | Alwar | |
| 2013/0298109 A1* | 11/2013 | Trinchini .................. | G06F 8/71 717/121 |
| 2015/0128105 A1* | 5/2015 | Sethi ........................ | G06F 8/36 717/106 |
| 2016/0026442 A1* | 1/2016 | Chhaparia ........... | G06F 9/45508 717/139 |

OTHER PUBLICATIONS

Marinescu et al., "COVRIG: A Framework for the Analysis of Code, Test, and Coverage Evolution in Real Software", ACM, 2014, 12pg.*

The International Search Report and The Written Opinion for PCT/US2016/038053, ISA/RU, Moscow, Russia, dated Oct. 13, 2016.

The International Searching Authority and the Written Opinion for PCT/US2016/038050, ISA/RU, Moscow, Russia, dated Oct. 13, 2016.

The International Search Report and the Written Opinion of the International Searching Authority for PCT/US2017/043120, ISA/RU, Moscow, RU, dated Nov. 2, 2017.

* cited by examiner

METHOD AND SYSTEM FOR EVALUATING COMPUTATIONAL ALGORITHMS DESCRIBED IN PRINTED PUBLICATIONS

CROSS REFERENCE TO RELATED APPLICATIONS

This application claims the benefit of U.S. Provisional Application No. 62/181,451 filed on Jun. 18, 2015 and U.S. Provisional Application No. 62/271,800 filed on Dec. 28, 2015, the contents of which are hereby incorporated by reference.

TECHNICAL FIELD

The disclosure generally relates to the field of computer programming tools, and in particular to a computing platform and method to assist in programming, researching, evaluating, and/or maintaining computational algorithms.

BACKGROUND

As the development of software applications evolves, programming accurate and efficient code has become a real challenge. A typical software application interfaces with different modules, e.g., using APIs, and should be programmed to enable its execution on different platforms and operating systems. For example, a software application (app) should be available for execution over different types of operating systems such as Linux®, Mac OS® and Windows®. Furthermore, as execution of many software applications has been migrated to cloud computing infrastructures, the code should be written such that its execution is supported by any computing environments in the cloud infrastructure. Thus, in sum, the complexity of software applications imposes a real challenge on programmers.

In order to enable the rapid creation, setup, and deployment of applications, resources that include "off-the-shelf" functions, algorithms, and pieces of codes are available. Such resources range from academic and scientific publications to code repositories (e.g., GitHub). However, such resources are limited in that they cannot provide executable code that can be easily evaluated and integrated in a software application or project being researched or developed. For example, a scientific publication (e.g., in an IEEE® article) would likely include a textual description of an algorithm or at best its pseudo code rather than the code itself. Further, even if such a resource provides executable code, such code may not be compatible with the software application or project as is.

Learning and evaluating code-focused scientific publications and text books (collectively referred to as "printed publications") can be difficult and limiting. That is, printed publications generally do not include any code that can be immediately executed on a computing environment that the software application is developed for. At best, printed publications include a detailed description of the code, some samples, and/or pseudo code. The reader has no way to "experience" the code and/or to otherwise judge whether the code described in the printed publications would serve its purpose in a computer program once deployed in a computing environment.

Thus, to evaluate the functionality and performance of the algorithm, executable code should be coded and tested in that computing environment. This is a time consuming and error prone task. It should be emphasized that drawbacks of printed publications as discussed herein are equally relevant when the printed publications are electronic versions. That is, there is no way to readily evaluate the functionality and performance of the algorithm or code, as described in either a printed or an electronic version, in a computing environment.

Further, publishers of printed and/or electronic publications suffer from loss of revenue as researches increasingly turn to search engines for information. A major concern for publishers is that printed publications (and particularly textbooks) will become obsolete. This is mainly due to the fact that text books and publications currently do not offer any mechanisms that can be helpful to programmers or researches when developing algorithms.

Furthermore, due to the voluminous amount of academic and scientific publications, open-source codes, and other algorithm resources, it is almost impossible to search for the right algorithm that would fit into a software application and would perform an intended function. Additionally, it can be difficult to organize additional references or information obtained from sources other than a particular printed or electronic publication.

It would therefore be advantageous to provide a solution that overcomes the deficiencies noted above by enabling integration of algorithms' codes into printed publications.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Some embodiments disclosed herein include a method for evaluating computational algorithms described in printed publications. The method comprises analyzing a printed publication to identify at least one computational algorithm described in the printed publication; analyzing the at least one identified computational algorithm to identify at least algorithm-indicating information related to the at least one identified computational algorithm; detecting using the algorithm-indicating information at least one software container likely to be associated with the at least one identified computational algorithm; and executing the at least one software container in a computing environment, wherein the computing environment includes computing resources configured to support execution of the software container.

Some embodiments disclosed herein include a system for evaluating computational algorithms described in printed publications. The system comprises a processing system and a memory; the memory containing instructions that, when executed by the processing system, configure the system to: analyze a printed publication to identify at least one computational algorithm described in the printed publication; analyze the at least one identified computational algorithm to identify at least algorithm-indicating information related to the at least one identified computational algorithm; detect using the algorithm-indicating information at least one software container likely to be associated with the at least one identified computational algorithm; and execute the at least one software container in a computing environment, wherein the computing environment includes computing resources configured to support execution of the software container.

BRIEF DESCRIPTION OF THE DRAWINGS

The subject matter disclosed herein is particularly pointed out and distinctly claimed in the claims at the conclusion of the specification. The foregoing and other objects, features and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claims. Moreover, some statements may apply to some inventive features but not to others. In general, unless otherwise indicated, singular elements may be in plural and vice versa with no loss of generality. In the drawings, like numerals refer to like parts through several views.

Figure 1:
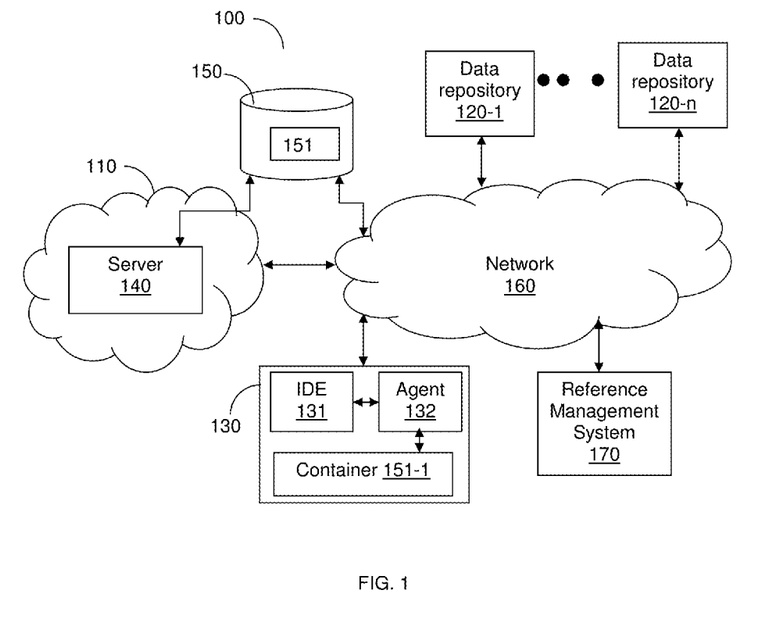
FIG. 1 is a schematic diagram of a networked system utilized to describe the disclosed embodiments.

FIG. 1 is an example diagram of a networked system 100 utilized to describe the various disclosed embodiments. The networked system 100 includes a cloud computing platform 110, a plurality of data repositories 120-1 through 120-N, a computing device 130, a server 140, and a data warehouse 150. The various elements of the system 100 are communicatively connected to a network 160. The network 160 may be, for example, a wide area network (WAN), a local area network (LAN), the Internet, and the like.

The cloud computing platform 110 may be a private cloud, a public cloud, or a hybrid cloud providing computing resources to applications or services executed therein. The plurality of data repositories 120-1 through 120-N (hereinafter referred to individually as a data repository 120 or collectively as data repositories 120) are resources including computational algorithms. In the context of the disclosed embodiments, a computational algorithm is any algorithm that can be utilized in the field of mathematics and/or computer science. Such an algorithm is typically defined as a self-contained step-by-step set of operations to be performed. As an example, a computational algorithm may be designed to perform calculation, data processing and analysis (such as, image processing, transaction processing), automated reasoning, and more.

The computational algorithms may be included in "printed publications." It should be noted that "printed publications," as described hereinafter, refers to any printed and/or online versions of text books, scientific or academic publications (e.g., articles or magazines), blogs, manuals, tutorials (textual or video), and so on. A computational algorithm saved in a data repository may be described as a pseudo code, one or more mathematical equations, a written description, a code sample or samples, or any combination thereof.

The computing device 130 may include, for example, a personal computer, a laptop, a tablet computer, a smartphone, and the like. Each computing device 130 may include an integrated development environment (IDE) 131 or any other tool that allows computer programmers to develop software. Each computing device 130 further includes an agent 132 locally installed and executed over the computing device 130. In an embodiment, the agent 132 may be configured to perform the embodiments discussed in greater detail below.

According to various embodiments, the data warehouse 150 includes containers 151 (or image containers) associated with printed publications stored in the data repositories 120. Specifically, each printed publication can be associated with one or more containers 151. A container 151 includes code as well as software resources needed for the proper execution of the code in a target computing environment. In an embodiment, the containers may be generated based on algorithms described or otherwise featured in printed publications as described in FIGS. 5 and 6.

In an embodiment, each container 151 is identified by a container identifier. Each container identifier is mapped to a printed publication that describes a computational algorithm that the container identifier can execute. In one implementation, the server 140 can maintain a table for mapping container identifiers to printed publications (e.g., based on the subject matter of the printed publications). In another embodiment, the container identifier can also be stored as an additional identifier of the printed publication. Thus, the mapping may be based on the appearance of the container identifier within printed publications. The container identifier is utilized to retrieve the respective container from the data warehouse 150.

Figure 2A:
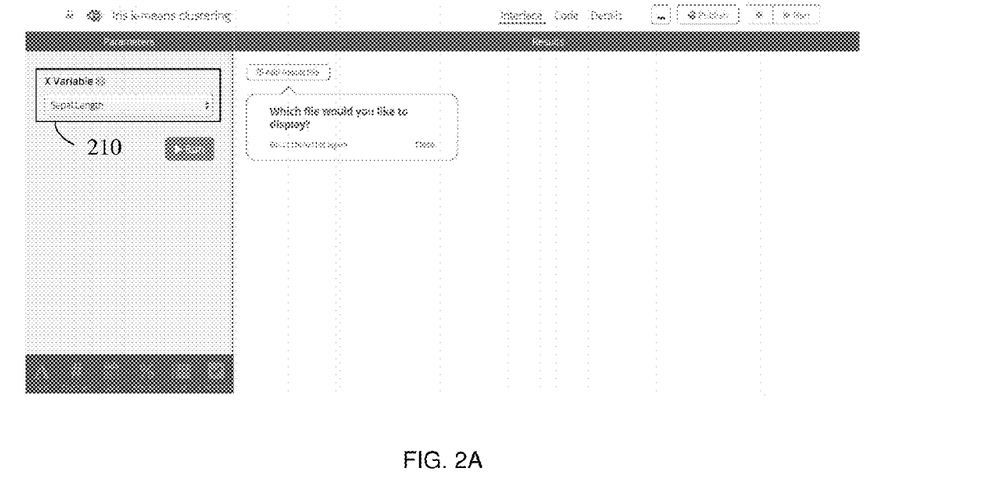
FIGS. 2A and 2B are screenshots utilized to describe the creation of GUI components according to an embodiment.
Figure 2B:
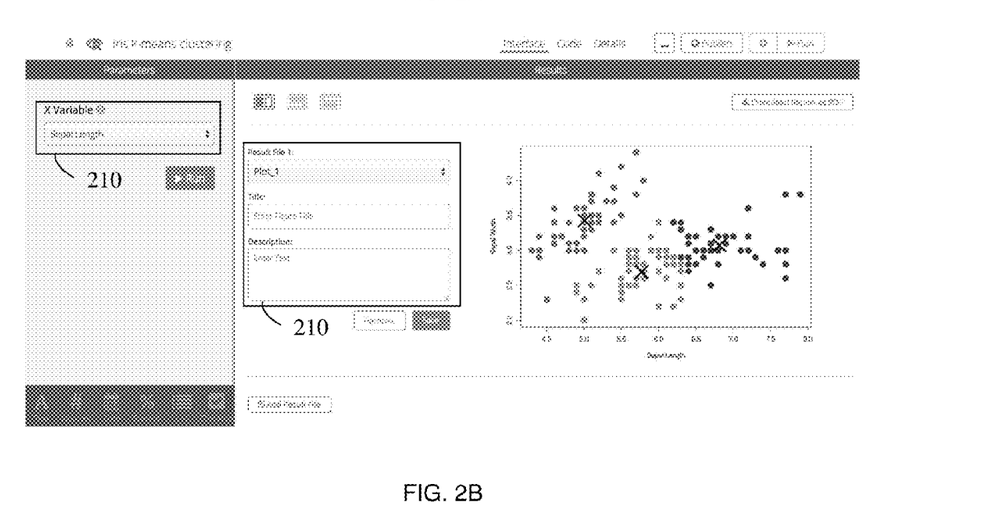

In an embodiment, when the printed publication is displayed on the computing device 130 (to be reviewed by the user), it is checked if there is a container associated with that publication, i.e., if there is a container identifier that is mapped to the publication displayed on the device 130. If there is a prior association ("pre-association") between a container and a publication, a link (or a button) to the container may be displayed. An exemplary display of a link to the container is described further herein below with respect to FIG. 2. Otherwise, if there is no prior association between a container and a publication, an attempt to create such an association is performed on-the-fly. Various techniques for creating on-the-fly associations between containers and printed publication are described further herein below.

In another embodiment, an associated container is provided to the user using, for example, a matrix barcode (such as, e.g., a QR code) appearing in the printed publication. In a further embodiment, a user, by means of a user device 130, can access the containers 151 in the data warehouse 150 by simply scanning the barcode. To this end, the barcode may be encoded with a container identifier of any container related to the algorithm(s) mentioned in the publication. This embodiment may allow a user reading a physical version of a printed publication to access code described therein.

In an embodiment, containers 151 accessed through the barcode or the "container button" are retrieved and saved in the server 140 to allow for execution by the computing device 130. In a further embodiment, the associated containers 151 are retrieved by an agent 132. In an embodiment, all such containers 151 are also listed in a user account, allowing the user to easily access and execute the containers at a later time.

According to various embodiments, the agent 132 is configured to interface with the server 140 to retrieve at least one container 151 associated with one or more computational algorithms mentioned in a printed publication currently being reviewed by a user of the device 130. The retrieved container 151 may be further stored in the computing device 130.

Various techniques can be utilized to determine which container(s) may be associated with the printed publication. When a printed publication is pre-associated with a container, then the respective container identifier may be encoded in the barcode or included in the publication's metadata. Thus, when the barcode is scanned or when the publication is uploaded to the user device, the container identifier is extracted. For example, using the extracted container identifier, the respective container can be retrieved from the data warehouse 150.

When there is no pre-association between a container and printed publication, the server 140 or the agent 132 may be configured to search for a container matching the printed publication. To this end, an association between a content identifier and the printed publication may be generated.

In an embodiment, the printed publication is scanned to search for details that uniquely identify a computation algorithm. For example, such details may include a pseudo code, a code sample, an executable code, equations, and so on. Then, using the identifying details, a search through the data warehouse 150 is performed. A container identifier of a container that best matches the identifying details is returned. The returned container identifier is then associated with the printed publication.

It should be noted that associating a container identifier to a printed publication can be performed in the background, i.e., while one of the printed publications is being displayed on the user device. To this end, the data repositories 120 are crawled through, and any printed publications encountered during the crawl that have not been associated with a container identifier are further analyzed to detect one or more containers matching the computational algorithm described therein.

In an embodiment, the agent 132 is also configured to integrate the retrieved container(s) in a software program developed by the user. An example of this would be using the IDE 131. According to this embodiment, the integration of the containers includes compiling or loading containers into code provided by the IDE 131.

As a non-limiting example, a user reads an article about an algorithm for image compression, which is being discussed with a reference to exemplary pseudo code. The pseudo code in the article is associated with a container 151-1, which contains the executable code for compressing images. Accordingly, a button for the container 151-1 may be displayed in the article. In response to a user clicking or otherwise interacting with the button, the agent 132 is configured to download the container 151-1, to integrate the downloaded container 151-1 in the IDE 131, and to execute the container's 151-1 code in a computing environment supported by the container's code. In an embodiment, upon downloading a container 151-1, a link is created between the textual description (and any related drawings) and the respective code included in the container. This allows for easy navigation between the code and the textual description.

In a further embodiment, output generated by execution of a container is indexed. This allows to link a resulted output to a specific block of code (in the container) that causes generating the output.

The indexing of the outputs further allows to cache results of container executions. To this end, the agent 132 is configured to identify previous execution results from one or more containers (or a specific code block or blocks), and retrieve the results without re-executing such container(s). This allows to shorten the runtime and minimize the utilization of computing resources.

It should be noted that the printed publications can be displayed on the device 130 by any type of software program equipped with viewing capabilities. Examples for such software programs include, but are not limited to, a web browser (such as Chrome®, Internet Explorer®, etc.), Adobe Acrobat®, Microsoft Word®, and the like. In contrast, once downloaded to the device 130, the container 151-1 is opened in an environment (e.g., the IDE 131) that allows editing, executing, and/or debugging of the container's code.

Specifically, the agent 132 is configured to provide the container 151-1 with a complete set of interfaces to the computing environment. That is, any input to or output generated by the container 151-1 is received or sent through the agent 132. As an example, the agent 132 interfaces between the container 151-1 and the IDE 131, the server 140, and an operating system and file system of the computing device 130. The agent 132 is also configured to install all software resources required for the execution of the container 151-1 on the computing device 130.

As noted above, the container 151-1 includes such software resources and the agent 132 is configured to select those resources that are needed for the proper execution of the container's 151-1 code. In certain configurations, different versions of the container's 151-1 code are also saved. It should be noted that the agent 132 can check which resources are required for installation and which are not. For example, if the container's 151-1 is coded in Python, the agent installs a Python native in the container 151-1. As such, the container 151-1 can be executed on any computer regardless of whether the computer includes or does not include a Python native. Alternatively, the container 151-1 may call for installation of a Python native on the fly. Thus, for example, if the agent 132 detects that the operating system of the device 130 does not support Python, then the agent 132 causes installation of the native Python on the device 130, on-the-fly. It should be appreciated that this technique does not require the user to install any files and further allows seamless sharing and execution across different devices.

In another embodiment, the agent 132 is further configured to provide the IDE 131 with the code included in the container 151 to enable the display of such code in the IDE 131.

In a further embodiment, the agent 132 is configured to generate a user interface, e.g., a graphical user interface, based on the container's code. The developer of the container would not be required to code any GUI for inputting data or outputting the results. The developer is merely required to specify which variables are input variables.

The agent 132 is configured to scan the code, identify the specified input variables and their types, generate GUI elements respective such variables, and display the generated GUI elements according to a specific order in which the inputs for the computational algorithm should be received. The agent 132 is further configured to provide an output window for displaying the execution's results.

The GUI elements, generated according to the disclosed embodiments, may include, but not limited to, dropdown menus, text boxed, combo box, input files, and so on. For example, FIG. 2A shows a GUI interface that can be utilized for evaluating a k-means clustering algorithm. The GUI element, dropdown menu 210, is used for providing an input parameter "sepal.length". As shown in FIG. 2B, upon running the container with the algorithm's code, GUI elements 220 are displayed. Such elements prompt the user to select how to save the execution's results. It should be noted that the dropdown menus 210 and GUI elements 220 are not part of k-means clustering algorithm, but added during run-time of the container's code by the agent 132.

Certain tasks as performed by the agent 132 can also be carried out, alternatively or collectively, by the server 140. In an embodiment, the container 151 can be executed by the server 140 and its inputs/outputs will be sent to the agent 132 through an API. As an example, a container 151-1 for computing averages can receive an input data set (e.g., a list of student grades) provided to the server 140 by the agent 132, and upon execution of the container 151-1 by the server 140, the average of the student grades are returned to the agent 132. The input data set is part of the container 151-1.

It should be appreciated that the generated GUI enables easy and fast interaction with the executed computational algorithm. For example, a user evaluating the computational algorithm is not required to enter a series of datasets through a command line.

In order to allow execution of a container 151, the server 140 is configured to create a computing environment that supports the execution of the container 151. For example, if a container 151-1 includes a Python code, a virtual machine (not shown) that can run Python is instantiated by the server 140. In an embodiment, the creation of computing environments for running containers 151 can be performed on-demand (e.g., upon receiving a request to run a container). In another embodiment, computing environments utilized by "popular" containers are always available.

Figure 3:
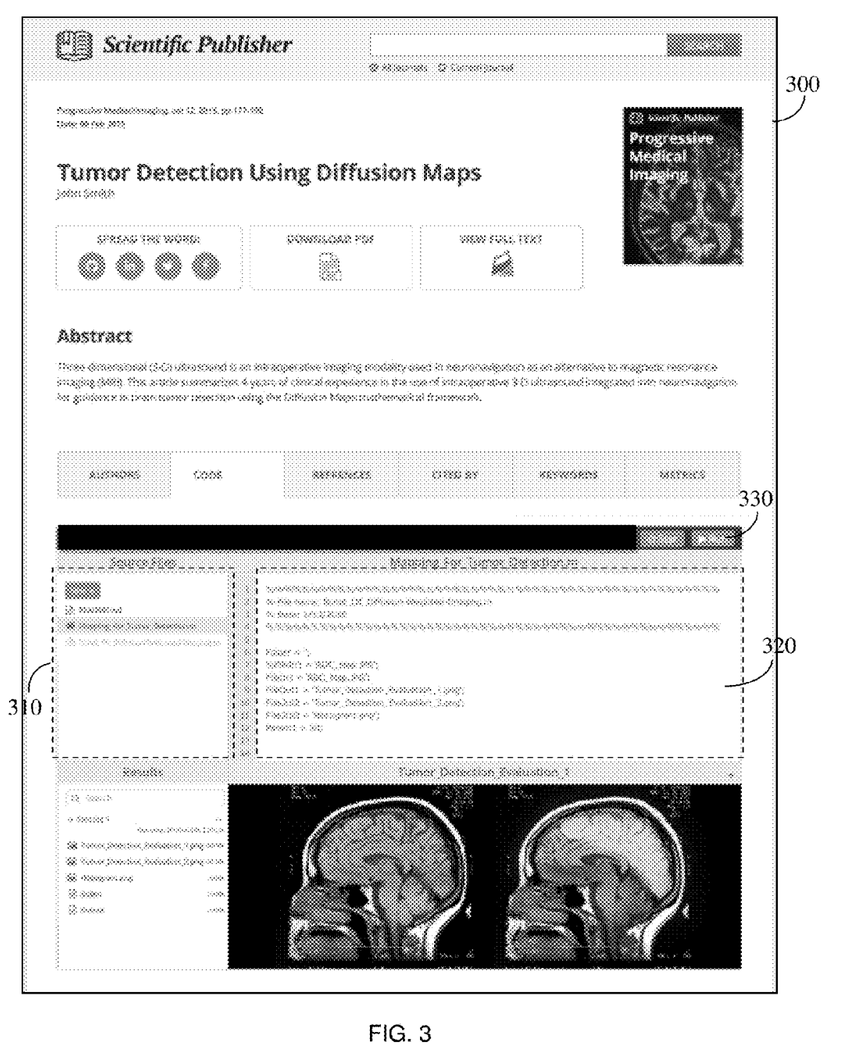
FIG. 3 is a screenshot showing a printed publication and associated container according to an embodiment.

According to some disclosed embodiments, the evaluation of the performance and/or functionality of an algorithm can also be performed through the web interface. An exemplary and non-limiting screenshot of a webpage 300 for evaluating an algorithm is seen in FIG. 3. The webpage 300 is rendered by the web interface. The web interface may be, for example, a web site of a publisher, a library, a class, a school, a blog, and the like. The web interface can be any software program for reviewing printed publications, examples for which are provided above.

The article depicted in the webpage 300 is about a "frequency-tuned salient region" algorithm. The container associated with this algorithm can be retrieved upon clicking on the code tab 310.

As shown in FIG. 3, the webpage 300 displays the code associated with a container generated for the "frequency-tuned salient region" algorithm. In this example, the algorithm is composed of an executable code 320 "Saliency CVPR2009" and images listed in the file list 310. The images are served as input to the program, and the results of the execution may be displayed in response to user interaction with a "Run" button 330. The input images may be those illustrated in the article.

Once the user clicks the "Run" button 330, the respective container generated for the recognized algorithm (and any changes therein) is executed by the server 140. In certain embodiments, only containers executed on a webpage showing a "code tab" can be rendered and displayed on the user device. The generation of the "code tab" can be trigged on the device 130 by scanning a matrix barcode (e.g., a QR® code) appearing in a printed publication. The barcode will be encoded with a container descriptor of the "frequency-tuned salient region" algorithm.

It should be noted that the disclosed embodiments allow a programmer to evaluate any computational algorithm mentioned in a printed publication without writing and programming code and/or integrating the code in a computing environment. This allows the user to compare and contrast the different algorithms mentioned in different publications reviewed by the user. To this end, a predefined input data set is predefined to be utilized by containers designed to execute similar algorithms. The server 140 is configured to execute each container and measure performance parameters. Such parameters may be global and/or specific parameters. The global parameters are agnostic to the purpose of the algorithm, while the specific parameters are related to the purpose and/or function of the algorithm. For example, global parameters may include execution time, memory, CPU, bandwidth utilization, and so on. The specific parameters may be, for example, a compression ratio for lossless compression algorithms.

In another embodiment, additional insights can be generated and provided as information layers to a particular printed publication. For example, the information layers may include, but are not limited to, performance related to executing the computational algorithm discussed in the article in different computing environments, which equations of the algorithm are required for the execution of the process, similar computational algorithms discussed in different printed publications, and so on.

In another embodiment, the server 140 and the agent 132 can interface with a reference management system 170. Typically, the reference management system 170 is a database of printed publications which allows an auditor of a printed publication to easily add citations to the printed publication. Each reference in the reference management system 170 is associated with metadata. The metadata include bibliographic information such as, for example, a title, authors, a publication date, and so on. Associating the reference with the metadata may include, but is not limited to, adding a container identifier of a referenced container associated with the printed publication to the metadata. A referenced container may be a container identified based on the metadata.

The metadata can be also complemented by the server 140 and/or agent 132 to include additional pieces of information. Such information may include a container creation date, a container's code type, user interaction, combinations thereof, and so on. The user interaction lists how users downloaded or executed a specific container, the number of repetitions of a container per user, the number of runs, the number of views, a benchmark, combinations thereof, and so on. In an exemplary embodiment, a ranking process is implemented to rank matching containers to a user query respective of the generated metadata. The ranking may be based, in part, on the user interaction information contained in the metadata. For example, a ranking score indicative of the popularity of a container may be computed using the number of runs, the number of views, and the number of downloads. The containers and/or their respective printed publications will be ranked based on the computed score.

In an embodiment, the metadata of a reference maintained in the reference management system 170 is enriched with a container identifier of a container that corresponds to the printed publication of the reference. As a result, when a citation is added to a printed publication, the author and the reader of the publication can easily access the respective container associated with the publication in the citation. Such container can be represented using a special icon indicating that a container is available and the programming language/environment the container supports.

In a further embodiment, when a user reads a printed publication with a citation featuring a container identifier, the agent 132 is configured to detect any container identifier associated with any citation reviewed by the user. The agent 132 may further be configured to launch a widget displaying the container's contents. In an embodiment, the widget may be launched when the reader hovers over a citation.

In yet another embodiment, the IDE 131 (possibility under the control of the agent 132) can identify functions as a programmer writes program code and retrieves the containers that related to the identified functions. The retrieved containers are only those that can implement/execute the identified function and in a language supported by the program's code. For example, if the programmer writes a program using Matlab® that calls for an image compression function, then potential container(s) that include Matlab code for image compression functions will be retrieved and displayed to the programmer. In an exemplary implementation, the containers are retrieved and displayed as the IDE 131 identifies a code line calling for an image compression function.

In some implementations, the server 140 typically includes a processing system (not shown) connected to a memory (not shown). The memory contains a plurality of instructions that are executed by the processing system. Specifically, the memory may include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The processing system may comprise or be a component of a larger processing system implemented with one or more processors. The one or more processors may be implemented with any combination of general-purpose microprocessors, microcontrollers, digital signal processors (DSPs), field programmable gate array (FPGAs), programmable logic devices (PLDs), graphics processing units (GPUs), controllers, state machines, gated logic, discrete hardware components, dedicated hardware finite state machines, or any other suitable entities that can perform calculations or other manipulations of information.

In some implementations, the agents 132 can operate and be implemented as a stand-alone program or, alternatively, can communicate and be integrated with other programs or applications executed in the client device 130.

It should be understood that the embodiments disclosed herein are not limited to the specific architecture illustrated in FIG. 1 and other architectures may be equally used without departing from the scope of the disclosed embodiments. Specifically, the server 140 may reside in the cloud computing platform 110, a different cloud computing platform or datacenter. Moreover, in an embodiment, there may be a plurality of servers 140 operating as described hereinabove and configured to either have one as a standby, to share the load between them, or to split the functions between them.

It should be noted that a single computing device 130 with the IDE 131 and the agent 132 is described herein with respect to FIG. 1 merely for simplicity purposes and without limitation on the disclosed embodiments. Multiple computing devices, each featuring IDEs and/or agents, may be utilized in conjunction without departing from the scope of the disclosed embodiments.

Figure 4:
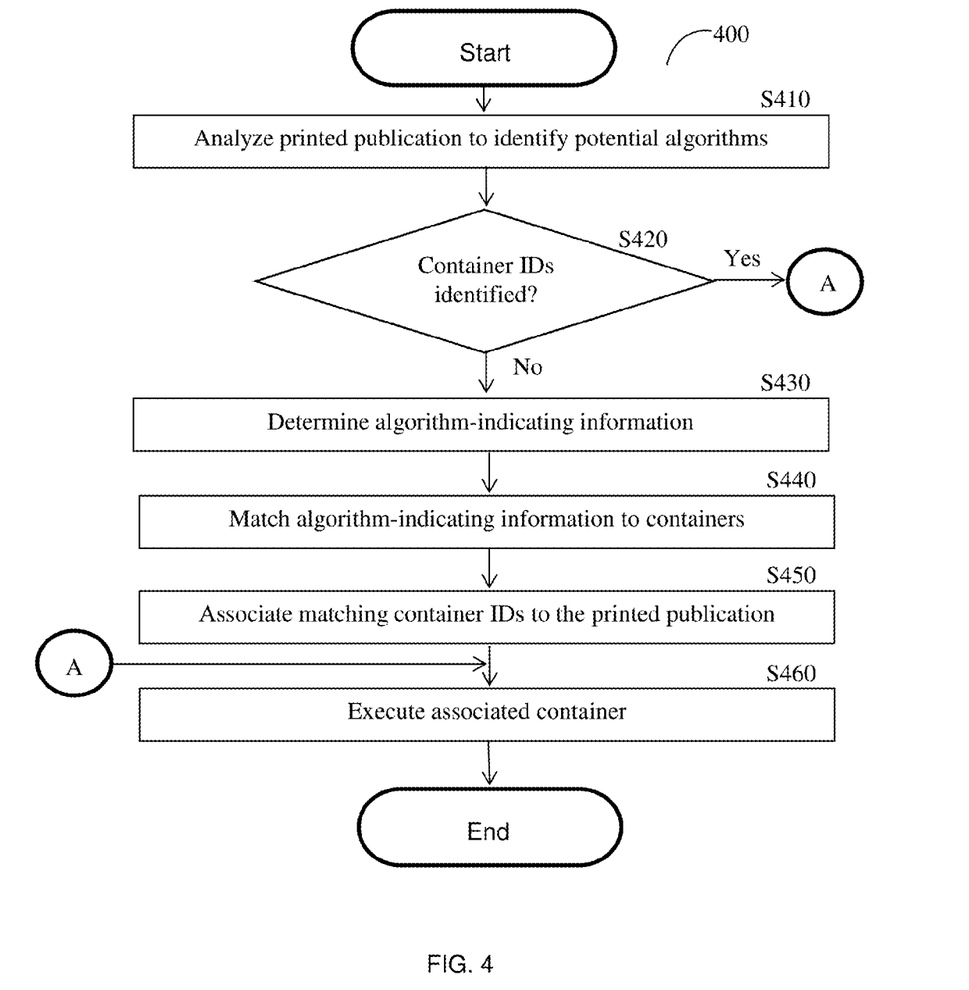
FIG. 4 is a flowchart illustrating a method for evaluating computational algorithms described in printed publications according to an embodiment.

FIG. 4 is an example flowchart 400 illustrating a method for evaluating computational algorithms described in printed publications according to an embodiment. The method allows execution of containers of computational algorithms described in printed publications without writing any code implementing a computational algorithm.

At S410, a printed publication is analyzed to identify potential computational algorithms described therein. The printed publication may be displayed on a computing device (e.g., the computing device 130), or a portion of the printed publication may be captured (e.g., via a camera installed on a computing device). In an embodiment, the printed publication may be an electronic publication featuring content such as, but not limited to, textual content, media content (e.g., images, videos, sounds, etc.), and so on. In a further embodiment, the analysis includes identifying content such as, but not limited to, textual content, media content (e.g., images, videos, sounds, etc.), and so on.

Alternatively or collectively, the analysis includes identifying at least one container identifier that is pre-associated with the printed publication. A pre-associated container identifier may appear in the printed publication directly, may be associated with a link (e.g., URL or URI) appearing in the printed publication, or may be included in a matrix barcode appearing in the printed publication. The at least one container identifier may be identified by, e.g., scanning the entire printed publication to identify container identifiers appearing therein and/or scanning a matrix barcode appearing in the printed publication to identify a container identifier provided in the matrix barcode.

At S420, based on the analysis, it is determined whether one or more container identifiers (IDs) have been identified in the printed publication. If so, execution continues with S460; otherwise, execution continues with S430.

At S430, the contents of the printed publication is analyzed to determine information indicating a computing algorithm. Such algorithm-indicating information may include, but is not limited to, pseudo code, a code sample, an executable code, equations, and so on. The analysis may include performing textual, visual, and/or sound analysis to identify the algorithm-indicating information.

At S440, the algorithm-indicating information is matched to information related to a plurality of containers to determine a container matching the algorithm-indicating information. In an embodiment, the matched container may be a container that best matches the algorithm-indicating information.

At S450, a container identifier of the matching container is associated with the printed publication. Such association may include, but is not limited to, adding the container identifier to the printed publication in a format including any or combination of text, matrix barcode, watermark, document metadata, and the like. Alternatively or collectively, S450 may include associating the printed publication with the container identifier in a database, maintaining records of containers, a metadata maintained by a reference management system (e.g., system 160), and so on.

At S460, a container associated with the printed publication is executed in a computing environment supporting the code of the container. In an embodiment, execution of the associated container may further include retrieving the container and/or integrating the container in an environment (e.g., the IDE 131). In a further embodiment, the container may be opened in the environment, thereby allowing a user to edit, execute, and/or debug the code of the container. In yet a further embodiment, execution of the container may further include installing any required resources (such as, e.g., a native execution environment).

The resources produced during the execution of a container 151 may be cached, for example, in a cache memory (not shown) connected to the server 140. The cached resources may include, for example, installation files, compilation files, results output by the container, combinations thereof, and the like. In another embodiment, the cache memory can be shared among different computing environments (e.g., "workers") created to execute the containers. This sharing of cache memory allows for sharing cached resources among the computing environments. It should be appreciated that the cached resources produced in one worker can be used by other workers without requiring re-compilation, thereby accelerating the execution and accessibility to containers.

Specifically, cached resources is based in part on the memory's state during container's code execution including all variables, matrixes, figures, intermediate/temporarily files, result files. The cached resources can be saved in the platform's centralized data repository, on a ready to execute "warm" worker, or both with a synchronizing mechanism. Thus, caching the resources include sharing the resources between executions of a container by the same or different accounts and users.

The trigger to use cached resources is when, for example, the state of code, input data, packages, versions, and configuration are detected as the same or similar enough to generate the same resources.

As an example, execution of empty spaces or lines, comments, or certain pieces of code can be avoided using the cached resources. That is, such resources can be utilized instead of executing their respective pieces of code.

The identification of such situation can be utilized by avoiding the wait time until the execution generates the same resources, and then avoid such resources instantly. The execution can then resume from that point to either execute new code according to user request or predefined code that will be executed from the shared resources point and forward automatically.

In an embodiment, shared resources can also be utilized during the compilation stage, where certain compilation steps are not performed. To this end, the state of the code and cached (shared) resources are identified, and compilation, execution and/or synchronization of shared resources is not performed.

In some embodiments when no container is associated with the printed publication, a container is generated based on the computation algorithm or algorithms described in the printed publication. The generated container is then associated with the printed publication. An embodiment for generating containers is further discussed with reference to FIG. 5.

Figure 5:
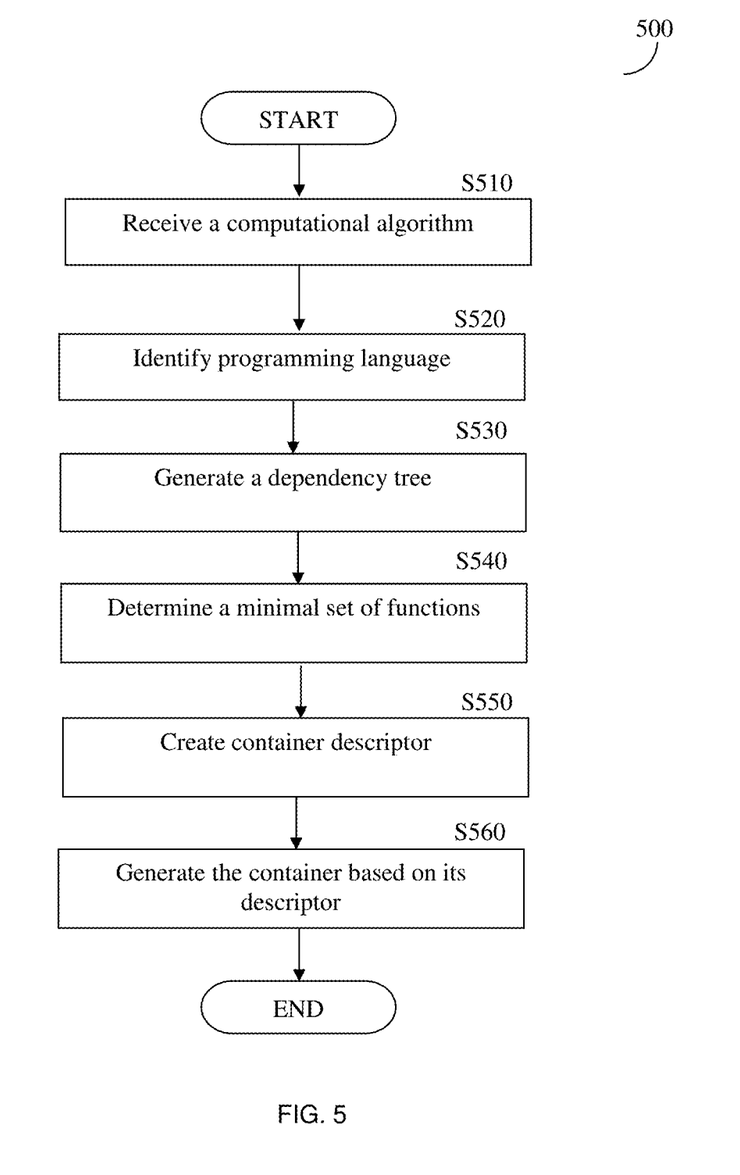
FIG. 5 is a flowchart illustrating a method for generating a container according to one embodiment.

At S510, a textual description of a computational algorithm is received. The textual description may be in a format of a pseudo code, one or more mathematical equations, a written description, a code sample or samples, any combination thereof, and the like.

At S520, if available, the programming language of the received algorithm is identified. The identification may be based on the file extension name, reserved words in the received textual description, keywords, syntax characters (e.g., '{' '}'; indentations, etc.), and so on. The programming language is any high-level programming language that may or may not require compiling by another program. Preferably, the programming language is a scripting language.

At S530, the received algorithm's textual description is analyzed to generate a dependency tree. At S540, based, in part, on the dependency tree, a minimal set of functions that should be included in the container is determined. In an embodiment, the output of S520 is utilized for the analysis at S540. The operation of S530 and S540 will now be described with reference to FIG. 6 that depicts a schematic diagram of a dependency tree 600.

Figure 6:
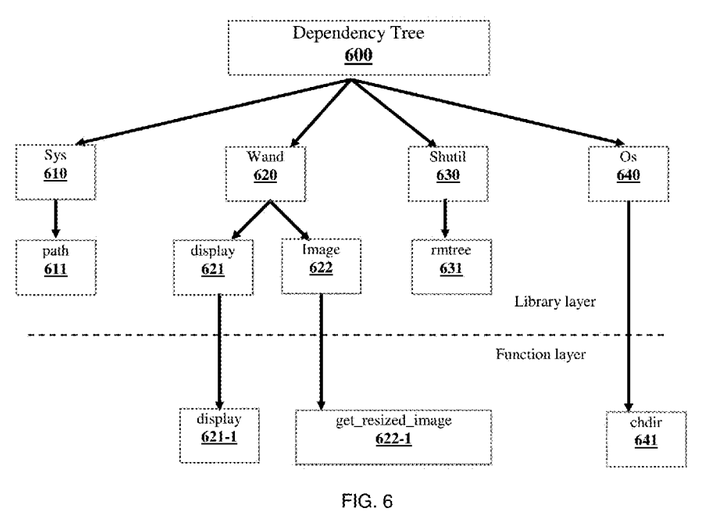
FIG. 6 is a schematic diagram of a dependency tree generated according to one embodiment.

The textual description (code) of the algorithm utilized to generate the example dependency tree 600 is:

```
#!/usr/bin/env python
import os
from sys import path
from shutil import rmtree
from wand.image import Image
from wand.display import display
from lib.images import *
os.chdir('/data/')
image = 'testing_image.jpg'
resized_image = get_resized_image(image, 100, 120)
display(resized_image)
```

The textual description is a Python script. Typically, execution of a Python script requires installation of a Python environment. Further, any Python environment typically requires native Python. The received code is scanned to determine which libraries and their functions (if any) are needed for the code's execution. Such libraries and functions are identified based on the "from < > import < >" syntax.

As shown in FIG. 6, the required libraries are: 'path' 611 from 'sys' 610 library, 'display' 621 and 'image' 622 from the 'wand' 620 library, 'rmtree' 631 from the 'shutil' 630 library, as well 'os' 640. The required functions are 'display' 621-1 from the 'display' library, 'get_resized_image' 622-1 from the 'image' library, and 'chdir' 641 from the 'os' library.

The analysis of the code (using, e.g., the identified programming language) indicates that the libraries 'sys' 610 and 'os' 640 are part of the native Python. Therefore, the minimal set of functions (in addition to native Python) that should be installed (or included) in the container are the 'display' 621-1 and 'get_resized_image' 622-1. The 'chdir' is part of the native Python that must be included in a container for executing the above example code.

It should be noted that the analysis of the code and the generation of the dependency tree ensures generating of compact containers. That is, for example, the 'wand' library 620 includes many sub-libraries, and each sub-library includes many functions. Thus, instead of generating a container that contains the entire 'wand' library 620, only the 'get_resized_image' 622-1 would be included in the container.

Referring back to FIG. 5, at S550, a container descriptor is created based on the analysis performed at S540. The container descriptor lists, at least, a minimal set of resources and their dependencies that should be included in the container. Referring to the example described herein above with respect to FIG. 6, the container descriptor would list a Python native and the functions 'display' and 'get_resized_image'.

In an embodiment, the container descriptor is created in a format that is supported by the type of container to be generated. For example, if such container type is Docker, the container descriptor format is a Dockerfile. A Dockerfile (container descriptor) is a script composed of various instructions and arguments that, when successively executed, perform actions on a container descriptor in order to generate a new container.

At S560, a container for executing the received algorithm is generated using the container descriptor. As a non-limiting example, such container may be a Docker container. In an embodiment, the container is generated from a "base" container descriptor which defines mandatory resources for the proper execution of the algorithm. Referring back to the above example, the base container descriptor may define native Python and the new container would include the additional functions 'display' and 'get_resized_image'. In an embodiment, the user can edit or modify the container descriptor or any container generated thereof.

The various embodiments have been discussed herein with a reference to a software container. The software container can be replaced with a virtual machine, a light virtual machine, or any applicable virtualization technologies without departing from the scope of the disclosure.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements. In addition, terminology of the form "at least one of A, B, or C" or "one or more of A, B, or C" or "at least one of the group consisting of A, B, and C" or "at least one of A, B, and C" used in the description or the claims means "A or B or C or any combination of these elements." For example, this terminology may include A, or B, or C, or A and B, or A and C, or A and B and C, or 2A, or 2B, or 2C, and so on.

All examples and conditional language recited herein are intended for pedagogical purposes to aid the reader in understanding the principles of the disclosed embodiments and the concepts contributed by the inventor to furthering the art, and are to be construed as being without limitation to such specifically recited examples and conditions. Moreover, all statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for automatically creating executable software code from a textual description of a computational algorithm described in printed publications, comprising:
    analyzing a printed publication in electronic form, by an electronic computing device, to identify at least one computational algorithm described in the printed publication;
    analyzing automatically, by the electronic computing device, the at least one identified computational algorithm to identify at least algorithm-indicating information related to the at least one identified computational algorithm;
    detecting, automatically, by the electronic computing device, using the algorithm-indicating information, at least one software container likely to be associated with the at least one identified computational algorithm; and
    executing, by the electronic computing device, the at least one software container in a computing environment, wherein the computing environment includes computing resources configured to support execution of the software container.

2. The method of claim 1, further comprising:
    associating an identifier of the at least one software container with the printed publication.

3. The method of claim 2, wherein associating the identifier of the at least one software container, further comprises at least one of:
    adding the identifier to the printed publication, wherein the identifier is a format including any of text and a matrix barcode; and
    saving the identifier in any of: a database maintaining software containers' records and metadata maintained by a reference management system.

4. The method of claim 1, wherein the printed publication is displayed on a user device or retrieved from a repository.

5. The method of claim 1, wherein the printed publication is in an electronic format and includes any of: a text book, a scientific publication, and an academic publication.

6. The method of claim 1, wherein the computational algorithm is in a format of at least one of: pseudo code, a mathematical equation, a written description, and a code sample.

7. The method of claim 1, further comprising:
    determining if the printed publication is pre-associated with at least one software container;
    retrieving the at least one pre-associated software container; and executing the at least one pre-associated software container in the computing environment.

8. The method of claim 1, wherein the computing environment includes resources selected based on a programming language identified in the computational algorithm.

9. The method of claim 1, wherein the computing environment is instantiated on-demand.

10. The method of claim 1, further comprising:
caching resources produced during execution of the software container, wherein the resources include at least one of compilation files, installation files, and results of the said execution.

11. The method of claim 10, wherein the cached resources are shared among a plurality of computing environments.

12. A non-transitory computer readable medium having stored thereon instructions for causing one or more processing units to execute the method of claim 1.

13. A system for automatically creating executable software code from a textual description of a computational algorithm described in printed publications, comprising:
a processing system; and
a memory, the memory containing instructions that, when executed by the processing system, configure the system to:
analyze a printed publication to identify at least one computational algorithm described in the printed publication;
analyze the at least one identified computational algorithm to identify at least algorithm-indicating information related to the at least one identified computational algorithm;
detect using the algorithm-indicating information at least one software container likely to be associated with the at least one identified computational algorithm; and
execute the at least one software container in a computing environment, wherein the computing environment includes computing resources configured to support execution of the software container.

14. The system of claim 13, wherein the system is further configured to:
associate an identifier of the at least one software container with the printed publication.

15. The system of claim 14, wherein the system is further configured to:
add the identifier to the printed publication, wherein the identifier is in a format including any of: text and a matrix barcode; and
save the identifier in any of: a database maintaining software containers' records and metadata maintained by a reference management system.

16. The system of claim 14, wherein the printed publication is displayed on a user device or retrieved from a repository.

17. The system of claim 14, wherein the printed publication is in an electronic format and includes any of: a text book, a scientific publication, and an academic publication.

18. The system of claim 14, wherein the computational algorithm is in a format of at least one of: pseudo code, a mathematical equation, a written description, and a code sample.

19. The system of claim 14, wherein the system is further configured to:
determine if the printed publication is pre-associated with at least one software container;
retrieve the at least one pre-associated software container; and
execute the at least one pre-associated software container in the computing environment.

20. The system of claim 14, wherein the computing environment includes resources selected based on a programming language identified in the computational algorithm.

21. The system of claim 14, wherein the computing environment is instantiated on-demand.

22. The system of claim 14, wherein the system is further configured to:
cache resources produced during execution of the software container, wherein the resources include at least one of compilation files, installation files, and results of the said execution.

23. The system of claim 22, wherein the cached resources are shared among a plurality of computing environments.

* * * * *